United States Patent Office 3,565,810 Patented Feb. 23, 1971

1

3,565,810
CONCENTRATED TERTIARY AMINE OXIDE-HYDROTROPE AQUEOUS SOLUTIONS

Marvin L. Mausner, Teaneck, and Brij L. Kapur, Paterson, N.J., assignors to Witco Chemical Company, Inc., New York, N.Y., a corporation of Delaware No Drawing. Filed Dec. 29, 1967, Ser. No. 694,412
Int. Cl. C11d *1/18*
U.S. Cl. 252—152 5 Claims

ABSTRACT OF THE DISCLOSURE

Concentrated aqueous detergent solutions in the form of substantially stable and homogeneous, pourable liquids are prepared by oxidizing a tertiary amine with hydrogen peroxide while adding a hydrotropic sulfonate of benzene or lower alkyl benzene under conditions to prevent gelling during the oxidation and while allowing substantially complete conversion of the tertiary amine to its oxide to occur. Easily pourable solutions having a solids content of at least about 35% with a 15–25% tertiary amine oxide concentration are obtainable.

This invention relates to the production of novel tertiary amine oxide-hydrotropic sulfonate detergent compositions and is especially concerned with an in situ technique for preparing homogeneous, pourable solutions of tertiary amine oxides and hydrotropic sulfonates containing relatively high proportions of active constituents.

Tertiary amine oxides of the formula $R_1R_2R_3N\rightarrow O$ in which $R_1$ and $R_2$ are lower alkyl (1 to 4 carbon atoms), particularly methyl or ethyl, and $R_3$ is an alkyl radical having from 10 to 20 carbon atoms are useful for various purposes, particularly as detergents or in detergent compositions and for other surfactant uses.

Amine oxides of tertiary aliphatic amines have been prepared by reacting the tertiary amine with dilute hydrogen peroxide. Preparation of amine oxides of tertiary amines having at least one higher alkyl group attached to the amine nitrogen atom using a similar procedure has generally been quite unsatisfactory due to poor conversion to the oxide, a slow rate of reaction, and the tertiary amine oxides are obtained as very dilute solutions. Early attempts to offset these disadvantages by employing more concentrated aqueous hydrogen peroxide solutions resulted in the reaction mixtures setting up into gels, thereby making effective agitation and uniform control of the reaction temperature impossible.

Various procedures have been suggested to overcome the aforesaid problems whereby relatively concentrated aqueous solutions of tertiary amine oxides can be produced. Thus, U.S. Pat. No. 3,215,741 discloses a method for directly preparing tertiary amine oxide in the form of aqueous solutions of relatively high concentration by oxidizing a tertiary amine with aqueous hydrogen peroxide and adding dilution water as the reaction proceeds, thus obviating the problem of gel formation; and U.S. Pat. No. 3,336,387 discloses the use of branched-chain alkyl tertiary amine oxides in combination with the commonly used normal alkyl amine oxides to prepare solutions of fairly low viscosity.

The present invention is based upon the discovery that non-viscous, hydrotropic tertiary amine oxide solutions having a high concentration of active materials, that is, both tertiary amine oxides and hydrotropes, can be directly obtained by oxidizing a tertiary amine in the presence of a hydrotropic sulfonate reaction medium diluent, as fully described below. It has also been found that the presence of the hydrotropic sulfonate, although utilized in large proportions, does not adversely affect the reaction pursuant to which the tertiary amine oxide is produced nor cause any untoward effects so far as gelling is concerned. The invention makes possible simplified and more economical handling and storage of detergent materials, and control of detergent formulations of the type which utilize both tertiary amine oxides and hydrotropes as ingredients of such formulations.

2

The hydrotropic sulfonates of the present invention are well known in the art and have been used extensively as coupling agents or solubilizers. Generally they are the sulfonates of benzene and lower ($C_1$ to $C_4$) alkyl benzenes. Typical of such hydrotropes are sodium benzene sulfonate, potassium benzene sulfonate, sodium xylene sulfonate, potassium xylene sulfonate, sodium toluene sulfonate, potassium toluene sulfonate, sodium cumene sulfonate, ammonium cumene sulfonate, potassium cumene sulfonate. In certain instances, the alkyl radicals have as high as 8 carbon atoms, as in sodium octylbenzene sulfonate, but this will not usually be the case. The hydrotropic sulfonate may also exist as ethanolammonium, diethanolammonium, and triethanolammonium salts. Generally they are the soluble salts of hydrotrope anions.

The tertiary amine oxides of the present invention are compounds of the formula $R_1R_2R_3N\rightarrow O$, the arrow representing a semipolar bond. If $R_3$ is a straight chain alkyl and is much longer than $R_1$ and $R_2$, the compound has surface active properties and is biodegradable. $R_3$ is generally $C_{10}$ to $C_{20}$ and $R_1$ and $R_2$ methyl, ethyl, or hydroxy lower alkyl such as hydroxymethyl and hydroxyethyl, in order to achive the optimum detergent qualities. Examples of tertiary amines from which the oxide can be prepared are dimethyldodecylamine, diethyldodecylamine, dimethyltridecylamine, dimethylhexadecylamine, and dimethyloctadecylamine. Especially preferred because of the advantageous surface active characteristics of the corresponding oxides are dimethyldodecylamine and dimethyloctadecylamine. Satisfactory conversions of tertiary amines to their corresponding tertiary amine oxides can be made using distilled grades of commercially available tertiary amines without further distillation prior to preparation of the amine oxide. Especially preferred are "Armeen DM12D" and "Armeen DM18D," which are distilled grades of n-dodecyldimethylamine and n-octadecyldimethylamine available from Armour Industrial Chemical Company. Commercial grade undistilled amines can also be employed, particularly in conjunction with chelating agents as disclosed in U.S. Pat. No. 3,283,007, and generally equivalent results are the rule.

So far as the manipulative steps per se are concerned, they may generally follow those disclosed in the aforementioned U.S. Pat. No. 3,215,741. Thus, the aqueous hydrogen peroxide should contain at least 20%, by weight, of hydrogen peroxide and up to about 70% hydrogen peroxide can be used. As to reaction temperatures, the same may range from about 40–80° C., 40–55° C. being the preferred range. For best results, the hydrotropic sulfonate is added dropwise or gradually in the form of an aqueous solution simultaneously with the hydrogen peroxide and just after gel formation has begun. The addition is usually completed after about 2 hours, depending upon the size of the batch, and the conversion is essentially completed. Upon standing overnight or with additional stirring the conversion will generally increase 98–100%.

In preparing the compositions of the present invention, which, as indicated above, generally have a tertiary amine oxide concentration of about 15–25%, by weight, as a particularly preferred range, and a high concentration of hydrotropic sulfonate, it is to be noted that the ratio of hydrotropic sulfonate to tertiary amine oxide is an important factor which determines whether the final solution will have the required qualities of homogeneity, stability and pourability at room temperature. It has been found, for example, that, when the preferred hydrotropic sulfonates, as exemplified by the xylene, toluene and cumene sulfonates, are utilized, the weight ratio of hydrotrope to tertiary amine oxide should be at least approximately 0.7 to 1. This is generally true when the tertiary amine oxide concentration is 15–25% by weight and at the same time the overall solids content is in the area of 35–45%. Thus, for instance, for octadecyldimethylamine oxide, illustrative suitable compositions contain 15.0% tertiary amine oxide and 18.3% sodium xylene sulfonate; and 16.1% tertiary amine oxide and 19.7% sodium xylene sulfonate. Proportions substantially in excess of or substantially below the 35% overall solids level will be gels or pastes. Also, proportions in this overall solids area which generally fall below the 0.7 to 1 hydrotrope-tertiary amine oxide ratio will usually be pastes or extremely viscous compositions. For dodecyldimethylamine oxide as a general rule, it has been found that optimum stability and homogeneity exist when, for a concentration thereof in the area of about 25% by weight, the overall solids level is about 45% by weight and the hydrotrope-tertiary amine oxide ratio is again at least 0.7 to 1, when the preferred hydrotropes such as sodium xylene sulfonate or sodium cumene sulfonate are employed.

The $C_5$ to $C_8$ alkyl benzene sulfonates, while usable, are distinctly less advantageous for use in the practice of the present invention than the lower alkyl benzene sulfonates. Generally, a higher hydrotrope to tertiary amine oxide ratio, namely, at least about 1.2 to 1, is used in the case of the $C_5$ to $C_8$ alkyl benzene sulfonates to produce fluid compositions, and the tertiary amine oxide concentrations possible are somewhat lower than with the lower alkyl benzene sulfonate hydrotropes.

Thus it can be seen that the quantities of materials necessary to cause optimum solubilization and concentrations of the active ingredients depend upon the particular components chosen. Many compatible components can be utilized, the limiting factor being that sufficient hydrotrope be employed to allow solubilization to occur, keeping in mind that the factors of tertiary amine oxide formula, percentage solids desired, and nature of hydrotrope are interrelated variables.

Numerous other variations in the practice of the present invention described herein will become apparent in the light of the guiding principles and teachings disclosed herein. Thus, by way of example, combinations of two or more hydrotropes can be used, as well as mixtures of two or more tertiary amines with one or more than one hydrotrope. Furthermore, other desirable product constituents may be added in the course of carrying out the process of the present invention.

From a practical standpoint, it is desired to have as little water as possible in the overall composition. A particularly preferred final product consists of 19 parts dimethyloctadecylamine oxide, 24 parts sodium xylene sulfonate, and the remainder water. The composition is clear, one phase, fluid, and pours easily at room temperature. Thus, compositions having both a high tertiary amine oxide content and a high overall solids content—both of which are desirable active ingredients—can be prepared. Further treatment or processing is unnecessary and the product is ready for use in various commercial applications.

The invention is illustrated but not limited by the following examples where all composition percentages reported are by weight and all temperatures are in degrees C.

EXAMPLE I 59 g. (0.2 mole) of distilled grade octadecyldimethylamine was brought up to a temperature of 40–45° with stirring. Slow, dropwise addition of 25.0 g. of a 30% $H_2O_2$ solution (0.22 moles $H_2O_2$) was started. After about 2 mls. of peroxide was added, the mixture became pasty and started to gel. At this point, addition of the hydrotrope, a sodium xylene sulfonate solution containing 79.4 g. of sodium xylene sulfonate and 158.8 g. of water, was begun. The peroxide—hydrotrope separate but simultaneous addition was continued for 50 minutes. During the addition the hydrotrope was added about 5 times faster than the peroxide. After the addition was complete, the mixture was stirred for 90 minutes at 55°. Analysis at this point showed that the final mixture contained 17.7% tertiary amine oxide and 1.2% unreacted tertiary amine. The conversion was 93.3%. After stirring an additional 16 hours, the tertiary amine oxide concentration was 18.3%, the conversion was 95.7% and the mixture contained 0.77% unreacted tertiary amine. The final mixture was a 40% active composition, including the amount of sulfonate hydrotrope added, and was clear, one-phase, nonviscous solution at room temperature.

EXAMPLE II

Following the general procedure of Example I, octadecyldimethylamine was oxidized in the presence of sodium cumene sulfonate using a 10% molar excess of 30% $H_2O_2$. The peroxide and the hydrotrope were added over a 1 hour period. Analysis of the product after 15 hours showed a clear, one-phase solution, easily pourable, and containing 14.6% tertiary amine oxide and 18.3% sodium cumene sulfonate. The conversion of tertiary amine to oxide was 99.4%. The ratio of hydrotrope to tertiary amine oxide for this composition was 1.22 to 1.

EXAMPLE III

Again, following the procedure outlined in Example I, dodecyldimethylamine was oxidized in the presence of potassium toluene sulfonate using a 100% molar excess of 30% $H_2O_2$. Conversion of tertiary amine to tertiary amine oxide was 93%. The product solution had a total solids concentration of 37%, of which 17.1% was dodecyldimethylamine oxide and 18.7% was hydrotrope. The solution was clear, one-phase, and non-viscous. The ratio of hydrotrope to tertiary amine oxide for this composition was 1.1 to 1.

EXAMPLE IV

Following the procedure of Example I, n-octadecyldimethylamine was oxidized in the presence of sodium toluene sulfonate. 30 g. of the $H_2O_2$ was added to 29 g. of n-octadecyldimethylamine in the presence of 99 g. of 40% sodium toluene sulfonate solution. The reaction was carried out at 40–45° and addition of the $H_2O_2$ and the hydrotrope was completed after 45 minutes. After standing overnight, the product solution showed a 100% conversion of tertiary amine to oxide and contained 17.6% tertiary amine oxide and 22.2% sodium toluene sulfonate. The product was non-viscous, readily pourable, and had a clear point less than 5° C.

What is claimed is:

1. A process for producing an aqueous solution of tertiary amine oxide and hydrotropic sulfonate of benzene or alkyl benzene, in which alkyl has up to 8 carbon atoms, said solution having a tertiary amine oxide concentration of at least about 15% by weight and a total solids content of at least about 35% by weight, the weight ratio of said hydrotropic sulfonate to said amine oxide being at least about 0.7 to 1, which comprises reacting a tertiary amine of the formula $R_1R_2R_3N$ where $R_1$ and $R_2$ represent alkyl radicals or hydroxy alkyl radicals having 1 to 4 carbon atoms, and $R_3$ represents an alkyl radical having from 10 to 20 carbon atoms with an aqueous hydrogen peroxide solution of at least 20% $H_2O_2$ by weight at a temperature range of about 40–80° C. until substantially complete conversion of said tertiary amine to its oxide has occurred, and, during the course of the reaction, adding the hydrotropic sulfonate separately but simultaneously with the hydrogen peroxide so as to maintain fluidity and allow effective agitation of the reaction mixture.

2. A process according to claim 1, wherein the hydrotropic sulfonate is at least one selected from the group consisting of sodium xylene sulfonate, sodium cumene sulfonate, sodium toluene sulfonate, sodium benzene sulfonate, ammonium cumene sulfonate, ammonium xylene sulfonate, potassium toluene sulfonate, potassium xylene sulfonate, potassium benzene sulfonate, and potassium cumene sulfonate.

3. A process according to claim 1, wherein the amine is selected from the group consisting of n-dodecyldimethylamine and n-octadecyldimethylamine.

4. An aqueous detergent solution made by the process of claim 1, said solution being in the form of a substantially stable and homogeneous, pourable liquid having a total solids content of at least about 35% by weight, said solids consisting essentially of a tertiary amine oxide of the formula $R_1R_2R_3N \rightarrow O$ where $R_1$ and $R_2$ represent alkyl radicals or hydroxy alkyl radicals having 1 to 4 carbon atoms, and $R_3$ represents an alkyl radical having from 10 to 20 carbon atoms, and a hydrotropic sulfonate of benzene or alkyl benzene in which alkyl has up to 8 carbon atoms, the concentration of said tertiary amine oxide being at least about 15% by weight and the ratio of said hydrotropic sulfonate to said tertiary amine oxide being at least about 0.7 to 1.

5. A process for producing an aqueous solution of tertiary amine oxide and sulfonates of $C_5$–$C_8$ alkyl benzene having a tertiary amine oxide concentration of at least about 15% by weight and a total solids content of at least about 35% by weight, the weight ratio of said hydrotropic sulfonate to said amine oxide being at least about 1.2 to 1, which comprises reacting a tertiary amine of the formula $R_1R_2R_3N$ where $R_1$ and $R_2$ represent alkyl radicals or hydroxy alkyl radicals having 1 to 4 carbon atoms and $R_3$ represents an alkyl radical having from 10 to 20 carbon atoms with an aqueous hydrogen peroxide solution of at least 20% $H_2O_2$ by weight at a temperature range of about 40–80° C. until substantially complete conversion of said tertiary amine to its oxide has occurred, and, during the course of the reaction, adding said sulfonate separately but simultaneously with the hydrogen peroxide so as to maintain fluidity and allow effective agitation of the reaction mixture.

References Cited

UNITED STATES PATENTS

| | | | |
|---|---|---|---|
| 3,001,945 | 9/1961 | Drew et al. | 252—152 |
| 3,179,599 | 4/1965 | Eaton et al. | 252—153 |
| 3,281,368 | 10/1966 | Zimmerer et al. | 252—152X |
| 3,283,007 | 11/1966 | Chadwick | 252—152X |

MAYER WEINBLATT, Primary Examiner

U.S. Cl. X.R.

252—153; 260—583, 584